United States Patent
Nguyen et al.

(10) Patent No.: US 7,040,405 B2
(45) Date of Patent: May 9, 2006

(54) PERMEABLE CEMENT COMPOSITION AND METHOD FOR PREPARING THE SAME

(75) Inventors: Philip D. Nguyen, Duncan, OK (US); Johnny A. Barton, Marlow, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

(21) Appl. No.: 11/069,078

(22) Filed: Mar. 1, 2005

(65) Prior Publication Data

US 2005/0145386 A1    Jul. 7, 2005

Related U.S. Application Data

(62) Division of application No. 10/322,697, filed on Dec. 17, 2002, now Pat. No. 6,938,692.

(51) Int. Cl.
*E21B 43/26* (2006.01)

(52) U.S. Cl. .................... 166/308.3; 166/283
(58) Field of Classification Search ............... 166/281, 166/283, 293, 297, 298, 308.1–308.3
See application file for complete search history.

(56) References Cited

U.S. PATENT DOCUMENTS

| | | | |
|---|---|---|---|
| 2,646,846 A | 7/1953 | Cutforth | |
| 3,043,790 A | 7/1962 | Sanders | 260/29.7 |
| 3,228,907 A | 1/1966 | Eash | 260/29.7 |
| 3,250,736 A | 5/1966 | Gibbs et al. | 260/29.6 |
| 3,354,169 A | 11/1967 | Shafer et al. | 260/29.7 |
| 3,654,991 A * | 4/1972 | Harnsberger et al. | 166/281 |
| 3,862,663 A | 1/1975 | Curtice et al. | 166/276 |
| 3,895,953 A | 7/1975 | Mehta | 106/88 |
| 4,086,201 A | 4/1978 | Peters et al. | 260/29.7 |
| 4,537,918 A | 8/1985 | Parcevaux et al. | 523/130 |
| 4,721,160 A | 1/1988 | Parcevaux et al. | 166/293 |
| 4,990,373 A | 2/1991 | Kittle | 427/244 |
| 5,258,072 A | 11/1993 | Gopalkirshnan et al. | 106/802 |
| 5,258,428 A | 11/1993 | Gopalkrishnan | 524/5 |
| 5,262,452 A | 11/1993 | Gopalkrishnan | 523/130 |
| 5,300,542 A | 4/1994 | Gopalkrishnan | 524/8 |
| 5,325,922 A * | 7/1994 | Cowan et al. | 166/293 |
| 5,339,902 A | 8/1994 | Harris et al. | 166/293 |
| 5,358,047 A | 10/1994 | Himes et al. | 166/280 |
| 5,389,706 A | 2/1995 | Heathman et al. | 524/5 |
| 5,529,123 A | 6/1996 | Carpenter et al. | 166/293 |
| 5,598,890 A | 2/1997 | Richard et al. | 166/276 |
| 5,679,731 A | 10/1997 | Rodriguez | 524/5 |
| 5,688,844 A | 11/1997 | Chatterji et al. | 524/8 |
| 6,202,751 B1 | 3/2001 | Chatterji et al. | 166/276 |
| 6,235,809 B1 | 5/2001 | DiLullo Arias et al. | 523/130 |
| 6,330,917 B1 | 12/2001 | Chatterji et al. | 166/295 |
| 6,364,945 B1 | 4/2002 | Chatterji et al. | 106/677 |
| 6,390,195 B1 | 5/2002 | Nguyen et al. | 166/276 |

OTHER PUBLICATIONS

Zhu, et al. "Engineering the StructureS of Nanoporous Clays with Micelles of Alkyl Polyether Surfactants," *Langmuir* 17:588-594 (2001).

* cited by examiner

*Primary Examiner*—Zakiya W. Bates
(74) *Attorney, Agent, or Firm*—Robert A. Kent; Baker Botts

(57) ABSTRACT

The current invention provides an improved permeable cement composition for formation of downhole sand screens. The improved composition includes an effective amount of a surfactant. Addition of the surfactant to the permeable cement composition yields at least a pumpable slurry with a minimal amount of water or brine solution.

20 Claims, No Drawings

PERMEABLE CEMENT COMPOSITION AND METHOD FOR PREPARING THE SAME

This application is a divisional of application Ser. No. 10/322,697 filed on Dec. 17, 2002, now U.S. Pat. No. 6,938,692.

BACKGROUND OF THE INVENTION

The current invention provides an improved permeable cement composition suitable for use in the downhole environment. The improved permeable cement composition is suitable for use in a wide array of downhole applications including but not limited to formation of sand screens and hydraulic fracturing.

The improved cement will be useful in overcoming problems associated with the production of fluids from unconsolidated or loosely consolidated subterranean formations. Fluids produced from subterranean formations of this nature typically carry sand into the well bore. The presence of the sand in the produced fluids rapidly erodes metal tubular goods and other production equipment. Eventually, the equipment must be replaced substantially increasing the costs of operating the wells.

Heretofore, gravel packs have been utilized in wells to prevent the production of formation sand. In gravel packing operations, a pack of gravel, e.g., graded sand, is placed in the annulus between a screen or a perforated or slotted liner and the walls of the well bore in the producing interval. The resulting structure filters sand from produced fluids.

Gravel packs successfully prevent the production of sand with formation fluids; however, they often fail and require replacement. While the initial installation of a gravel pack adds considerable expense to the cost of completing a well, the subsequent removal and replacement of a failed gravel pack adds an even greater financial burden to the operation of the well.

Thus, there are continuing needs for improved methods of preventing the production of formation sand, fines and the like with produced subterranean formation fluids.

SUMMARY OF THE INVENTION

The current invention provides a permeable cement composition. When fully cured, the permeable cement composition has a permeability of at least 1 darcy. Preferably, the permeability rating of the permeable cement composition is between about 10 darcies and about 50 darcies. Additionally, when fully cured, the permeable cement composition has a unconfined compressive strength of at least 345 KPa (50 psi). Preferably, the permeable cement composition has an unconfined compressive strength between about 689 KPa (100 psi) to about 13790 KPa (2,000 psi).

The current invention further provides a permeable cement composition comprising a hydraulic cement, graded sand and additional particulate matter. The additional particulate matter is selected from the group consisting of gilsonite, oil soluble particles and mixtures thereof. The cement composition has a permeability of about 1 darcy to about 50 darcies and a unconfined compressive strength of about 345 KPa to about 13790 KPa.

The current invention also provides an improved cement slurry suitable for forming a permeable cement sand screen in a downhole environment. The slurry comprises hydraulic cement, graded sand, a diluent, such as water or salt water, and an effective amount of a surfactant. The slurry optionally includes particulates such as but not limited to gilsonite, oil soluble resin, oil soluble polymer fiber, wax and other particles soluble in crude oil. The incorporation of the surfactant enhances the formation of the slurry from components which otherwise would not readily form a slurry.

In another embodiment, the current invention provides an improved cement slurry suitable for use in the downhole environment. For example, the improved cement slurry will readily form a permeable cement sand screen suitable for preventing the production of sand and other particulate matter from an unconsolidated subterranean formation. The improved slurry comprising a diluent, one to three parts by weight hydraulic cement per part diluent, five to twelve parts by weight graded sand per part diluent and an effective amount of a surfactant. Typically, the surfactant will comprise from about 0.01 to about 5 percent by weight of the final cement slurry. The surfactant enables the formation of a slurry from components that would not otherwise readily form a slurry. Additionally, the slurry optionally includes particulates such as but not limited to gilsonite, oil soluble resin, oil soluble polymer fiber, wax and other particles soluble in crude oil.

The current invention also provides a method for forming a permeable cement sand screen downhole. In the method of the current invention the permeable cement sand screen is formed in the portion of the well bore adjacent to a hydrocarbon producing subterranean formation. The method of the current invention comprises forming a slurry comprised of a hydraulic cement, graded sand, a diluent such as water or salt water and an effective amount of a surfactant. Further, the slurry optionally includes particulates such as but not limited to gilsonite, oil soluble resin, oil soluble polymer fiber, wax and other particles soluble in crude oil. The method of the current invention is suitable for practice in cased and uncased wells and may be used in conjunction with currently available production hardware. Typically, the well bore is completed with a casing. The casing and formation are subsequently perforated. Following completion and perforation, the slurry is placed in the annulus between the walls of the well bore and the casing and allowed to set, thereby forming a permeable cement sand screen.

Further, the current invention provides a method for hydraulically fracturing tight rock formations having reservoir permeabilities in the range of less than 1 millidarcies. The method of the current invention comprises completing a well bore by conventional methods including perforating the formation if necessary. Before or after completing the well bore, forming a slurry comprised of a hydraulic cement, graded sand, a diluent such as water or salt water and an effective amount of a surfactant. Additionally, the slurry optionally includes particulates such as but not limited to gilsonite, oil soluble resin, oil soluble polymer fiber, wax and other particles soluble in crude oil. Injecting the slurry downhole to the portion of the formation to be fractured under sufficient hydraulic pressure to fracture the subterranean formation. Subsequently the slurry is forced into the resulting fractures. Once the slurry has penetrated the formation, it is allowed to set within the fractures thereby forming a permeable cement composition within the fractures.

DETAILED DESCRIPTION OF THE CURRENT INVENTION

As noted above, the current invention provides an improved permeable cement composition. The improved permeable cement composition is prepared from a slurry comprising an effective amount of a surfactant. Addition of the surfactant to the relatively dry mixture of hydraulic cement, graded sand and diluent yields a readily pourable slurry. Accordingly, as used herein, the term "an effective amount" refers to the quantity of surfactant necessary to yield at least a pumpable slurry. Preferably, the slurry is pourable following addition of an effective amount of the surfactant.

As shown in the table below, the permeable cement composition of the current invention has high compressive strength and excellent permeability. Preferably, once fully cured the permeable cement composition will have a permeability of at least 1 darcy. More preferably, the permeable cement composition will have a permeability between about 10 and about 50 darcies. Additionally, once fully cured, the improved permeable cement composition will have an unconfined compressive strength (UCS) of at least 345 KPa (50 psi). Preferably, the permeable cement composition will have a UCS between about 689 KPa (100 psi) to about 13790 KPa (2,000 psi).

A variety of hydraulic cements can be utilized to form the slurry of the current invention, including but not limited to those comprised of calcium, aluminum, silicon, oxygen and/or sulfur which set and harden by reaction with water. Such hydraulic cements include Portland cements, microfine cements, pozzolana cements, gypsum cements, high aluminum content cements, silica cements and high alkalinity cements. Portland cements or their equivalents are generally preferred for use in accordance with the present invention. Portland cements of the types defined and described in API Specification For Materials And Testing For Well Cements, API Specification 10, 5th Edition, dated Jul. 1, 1990 of the American Petroleum Institute are particularly suitable. Preferred API Portland cements include classes A, B, C, G and H, with API classes G and H being more preferred and class G being the most preferred.

The particulate matter utilized in the performance of the present invention may comprise sand, bauxite, sintered bauxite, ceramic materials, glass beads, foamed ceramics, nut shells, coke, polymer beads or glass materials containing voids produced by gases or other processes such as hollow mineral glass spheres sold under the trade name "SPHER-ELITE" by Halliburton Energy Services, Duncan, Okla. The types of graded sand used in the slurry of the current invention will determine the permeability and influence the compressive strength of the cured permeable cement composition. In general, graded sand having mesh sizes between 100 mesh and 6 mesh will perform satisfactorily in the current invention. Preferred mesh sizes will range between 60 and 20 mesh.

The diluent used in the slurry provides the moisture necessary to yield a pourable or at least a pumpable slurry when combined with a surfactant. Diluents suitable for use in the current invention include fresh water or salt water. The term "salt water," as used herein, refers to unsaturated and saturated salt solutions such as but not limited to brines and seawater.

As previously indicated, a surfactant is added to the diluent, hydraulic cement and sand mixture to produce a pourable or at least pumpable slurry of cement. Preferably, the surfactant is an alkyl poly ether having the formula $RO(CH_2CH_2O)_nR'$ where R and R' are alkyl groups and n is an integer in the range of about 5 to about 50. An alternative surfactant suitable for use in the current invention has the formula: $RPhO(OCH_2CH_2)_mOH$, wherein R is an alkyl group having from about 5 to about 30 carbon atoms, Ph is phenyl and m is an integer in the range of from about 5 to about 50. A preferred surfactant in this group is ethoxylated nonylphenol containing in the range of from about 20 to about 30 moles of ethylene oxide.

Another surfactant appropriate for use in the current invention has the general formula: $R_1(OR_2)_nSO_3X$, wherein $R_1$ is selected from the group consisting of alkyl groups having from 1 to about 30 carbon atoms, cycloalkyl groups having 5 or 6 carbon atoms, $C_1$–$C_4$ alkyl substituted cycloalkyl groups, phenyl, alkyl substituted phenol of the general formula $(R_3)_aPh$—, wherein Ph is phenyl, $R_3$ is an alkyl group having from 1 to about 18 carbon atoms and a is an integer of from 1 to 3, and phenyl-alkyl groups wherein the alkyl groups have from 1 to about 18 carbon atoms and the phenyl-alkyl groups have a total of from about 8 to about 28 carbon atoms; $R_2$ is a substituted ethylene group of the formula —$CH_2CH_2R_4$, wherein $R_4$ is selected from hydrogen, methyl, ethyl or mixtures thereof; n is a number from 0 to about 40 provided that when $R_1$ is phenyl or alkyl substituted phenyl, n is at least 1; and X is any compatible cation.

Another suitable surfactant for use in the current invention is a salt having the general formula: $R_5$—$Ph(OR_6)_oSO_3X$, wherein $R_5$ is an alkyl radical having in the range of from 1 to about 9 carbon atoms, $R_6$ is the group —$CH_2CH_2$—, o is an integer from about 10 to about 20 and X is a compatible cation. Preferably, the cation is sodium.

Yet another surfactant which can be utilized is a salt having the formula: $R_7(OR_8)_pSO_3X$, wherein $R_7$ is an alkyl group having in the range of from about 5 to about 20 carbon atoms, $R_8$ is the group —$CH_2CH_2$—, p is an integer in the range of from about 10 to about 40 and X is a compatible cation. A preferred surfactant of this type is the sodium salt of a sulfonated compound derived by reacting a $C_{12}$–$C_{15}$ alcohol with about 40 moles of ethylene oxide commercially available under the name "AVANEL S150™" or by reacting a $C_{12}$–$C_{15}$ alcohol with about 15 moles of ethylene oxide having the formula: $H(CH_2)_{12-15}(CH_2CH_2O)_{15}SO_3Na$, (both referred to hereinafter as an "ethoxylated alcohol sulfonate") commercially available under the name "AVANEL S400™" both compounds are commercially available from PPG Mazer, a division of PPG Industries, Inc. of Gurnee, Ill.

Of the various surfactants described above which can be used, ethoxylated nonylphenol containing in the range of from about 15 to about 40 moles of ethylene oxide and the sodium salt of a sulfonated and ethoxylated compound having the formula $H(CH_2)_{12-15}(CH_2CH_2O)_{15}SO_3Na$ are preferred, with $H(CH_2)_{12-15}(CH_2\ CH_2O)_{15}SO_3Na$ being preferred.

The foregoing components and other suitable additives are combined to yield a permeable cement composition slurry which is at least pumpable, more preferably, the slurry is pourable. Any acceptable method for forming a cement slurry may be used to form the slurry of the current invention. In general, the slurry will comprise, based on the weight of the diluent component, one to three parts hydraulic cement, five to twelve parts graded sand and an effective amount of surfactant. Preferably, the surfactant will be added to the liquid diluent in an amount sufficient to produce a slurry of desirable consistency. Typically, the slurry comprises about 0.01 to about 5 percent of the surfactant by weight. Other components suitable for inclusion in the permeable cement of the current invention include particulates soluble in crude oil. For example, particulates such as but not limited to gilsonite, oil soluble resin, oil soluble polymer fiber, wax and other particles soluble in crude oil. During production, oil from the formation passing through the cement will dissolve these particles thereby increasing the permeability of the cement by increasing the void space within the cement. Thus, particles of this nature improve the permeability of the cement without detrimentally impacting the strength of the cement.

Table I below compares eight different formulations of the current invention. As demonstrated in Table I, the slurry of the current invention provides a permeable cement composition having sufficient permeability to permit the production of hydrocarbons through the cured cement into the well bore.

TABLE I

| Composition | Sample 1 | Sample 2 | Sample 3 | Sample 4 | Sample 5 | Sample 6 | Sample 7 | Sample 8 |
|---|---|---|---|---|---|---|---|---|
| Brine (2% CaCl2, mL) | 30 | 30 | 30 | 30 | 30 | 15 | 15 | 15 |
| Class G cement, (g) | 45 | 45 | 45 | 45 | 45 | 22.5 | 22.5 | 22.5 |
| Sand (grams) & mesh size | 210 of 40/60 | 270 of 40/60 | 270 of 40/60 | 210 of 20/40 | 270 of 20/40 | 150 of 40/60 | 165 of 40/60 | 180 of 40/60 |
| Surfactant (mL) | 0.05 | 0.05 | 0.05 | 0.05 | 0.05 | 0.08 | 0.08 | 0.08 |
| Stress during cure, KPa @ 65.6° C. {psi, @ 150° F.} | 0 | 0 | 1724 {250} | 1724 {250} | 1724 {250} | 1724 {250} | 1724 {250} | 1724 {250} |
| Permeability (Darcies) | 14 | 50 | 20 | 9 | 25 | 23 | 30 | 44 |
| Unconfined Compressive Strength KPa {psi} | 5647 {819} | 6143 {891} | 10990 {1594} | 6833 {991} | 8874 {1287} | 7350 {1066} | 4985 {723} | 3689 {535} |

The permeable cement composition of the current invention will be useful in a wide variety of applications. For example, the current invention provides a method for forming a permeable cement sand screen suitable for filtering fluids produced from a subterranean formation. According to this embodiment of the current invention, a well bore penetrating a subterranean formation is completed according to methods known to those skilled in the art. For example, a typical well bore completion entails installing and perforating a casing followed by fracturing the formation. Following perforation of the casing, a slurry of the permeable cement composition of the current invention is injected downhole into the casing and the annulus between the well bore walls and the casing. Once the permeable cement sets, the cement located inside the casing is reamed or drilled out to leave behind a permeable cement sand screen in the annulus. As noted above, once cured, the permeable cement composition of the current invention is sufficiently permeable to permit production of formation fluids through the cured cement composition into the well bore. Preferably, the permeable cement sand screen has a permeability of at least 1 darcy. More preferably, the permeable cement sand screen has a permeability ranging from about 10 darcies to 50 darcies. Thus, the permeable cement secures the casing within the well bore and eliminates the need for gravel packs and other similar sand filtration devices.

Additionally, the current invention provides an improved method for fracturing a subterranean formation. In particular, the permeable cement composition provides the means for fracturing relatively "tight" formations. For the purposes of this disclosure, a "tight" formation is defined as a formation having a permeability of less than 1 millidarcy. The method of the current invention provides for preparation of a permeable cement as described above. Prior to pumping the cement downhole, the well bore is preferably completed with a casing and perforated to provide fluid communication between the interior of the casing and the formation. The permeable cement composition is pumped downhole where it contacts the formation face through the perforations. Sufficient pressure is applied during the pumping process to initiate a fracture at the formation face. Pumping continues to force the permeable cement composition into fracture thereby propagating the fracture outwards into the formation. Following completion of the fracturing process, the permeable cement composition is allowed to cure while sufficient pressure is maintained on the well bore to preclude closure of the fractures.

Other embodiments of the current invention will be apparent to those skilled in the art from a consideration of this specification or practice of the invention disclosed herein. However, the foregoing specification is considered merely exemplary of the current invention with the true scope and spirit of the invention being indicated by the following claims.

We claim:

1. A method of fracturing a subterranean formation comprising the steps of:
   preparing a permeable cement composition comprising a hydraulic cement, graded sand, a diluent and an effective amount of surfactant wherein the surfactant is selected from the group consisting of:
   (a) $RO(CH_2CH_2O)_nR'$ where R and R' are alkyl groups and n is an integer in the range of about 5 to about 50;
   (b) $RPhO(OCH_2CH_2)_mOH$, wherein R is an alkyl group having from about 5 to about 30 carbon atoms, Ph is phenyl and m is an integer in the range of from about 5 to about 50;
   (c) $R_1(OR_2)_nSO_3X$, wherein:
      (i) $R_1$ is selected from the group consisting of:
         a. alkyl groups having from 1 to about 30 carbon atoms;
         b. cycloalkyl groups having 5 or 6 carbon atoms;
         c. $C_1$–$C_4$ alkyl substituted cycloalkyl groups, phenyl, alkyl substituted phenol of the general formula $(R_3)_aPh$—, wherein Ph is phenyl, $R_3$ is an alkyl group having from 1 to about 18 carbon atoms and a is an integer of from 1 to 3, and phenyl-alkyl groups wherein the alkyl groups have from 1 to about 18 carbon atoms and the phenyl-alkyl groups have a total of from about 8 to about 28 carbon atoms;
      (ii) $R_2$ is a substituted ethylene group of the formula —$CH_2CH_2R_4$, wherein $R_4$ is selected from hydrogen, methyl, ethyl or mixtures thereof;
      (iii) n is a number from 0 to about 40 provided that when $R_1$ is phenyl or alkyl substituted phenyl, n is at least 1;
      (iv) and X is any compatible cation;
   (d) $R_5$—$Ph(OR_6)_oSO_3X$, wherein $R_5$ is an alkyl radical having in the range of from 1 to about 9 carbon atoms. $R_6$ is the group —$CH_2CH_2$—, o is an integer from about 10 to about 20 and X is a compatible cation;

(e) $R_7(OR_8)_pSO_3X$, wherein $R_7$ is an alkyl group having in the range of from about 5 to about 20 carbon atoms, $R_8$ is the group —$CH_2CH_2$—, p is an integer in the range of from about 10 to about 40 and X is a compatible cation; and, (f) mixtures thereof; and introducing the permeable cement composition in the subterranean formation under sufficient pressure to create or enhance a fracture in the subterranean formation.

2. The method of claim 1, further comprising the step of maintaining hydraulic pressure within the well bore for a period of time while allowing the permeable cement composition to cure within the fracture.

3. The method of claim 1, wherein the permeable cement composition further comprises oil soluble particles.

4. The method of claim 1, wherein the hydraulic cement is selected from the group consisting of: Portland cements, microfine cements, pozzolana cements, gypsum cements, high aluminum content cements, silica cements, high alkalinity cements and mixtures thereof.

5. The method of claim 1, wherein the subterranean formation has an initial fluid permeability less than about 1 millidarcy.

6. A method of fracturing a subterranean formation comprising the steps of:

preparing a permeable cement composition comprising a hydraulic cement, graded sand, a diluent, an effective amount of surfactant, and oil soluble particles, the permeable cement composition being substantially free of an oil;

introducing the permeable cement composition in the subterranean formation under sufficient pressure to create or enhance a fracture in the subterranean formation; and allowing the permeable cement composition to set in the fracture.

7. The method of claim 6, wherein the oil soluble particles are oil soluble resin, oil soluble polymer fiber, wax, or other particles soluble in crude oil.

8. The method of claim 6, wherein the oil soluble particles comprise gilsonite.

9. The method of claim 6, further comprising the step of flowing crude oil from the subterranean formation so that the oil soluble particles dissolve as the crude oil from the subterranean formation passes through the permeable cement composition so as to increase the permeability of the permeable cement composition by increasing the void space within the permeable cement composition.

10. The method of claim 6, further comprising the step of maintaining hydraulic pressure within the well bore while the permeable cement composition sets within the fracture.

11. The method of claim 6, wherein the hydraulic cement is selected from the group consisting of: Portland cements, microfine cements, pozzolana cements, gypsum cements, high aluminum content cements, silica cements, high alkalinity cements, and mixtures thereof.

12. The method of claim 6, wherein the subterranean formation has an initial fluid permeability less than about 1 millidarcy.

13. A method of fracturing a subterranean formation comprising the steps of:

preparing a permeable cement composition comprising a diluent, about one to about three parts by weight hydraulic cement per part diluent, about five to about twelve parts by weight graded sand per part diluent, and an effective amount of a surfactant; and introducing the permeable cement composition in the subterranean formation under sufficient pressure to create or enhance a fracture in the subterranean formation.

14. The method of claim 13, further comprising the step of maintaining hydraulic pressure within the well bore while the permeable cement composition sets within the fracture.

15. The method of claim 13, wherein the hydraulic cement is selected from the group consisting of: Portland cements, microfine cements, pozzolana cements, gypsum cements, high aluminum content cements, silica cements, high alkalinity cements and mixtures thereof.

16. The method of claim 13, wherein the surfactant is selected from the group consisting of:

(a) $RO(CH_2CH_2O)_nR'$ where R and R' are alkyl groups and n is an integer in the range of about 5 to about 50;

(b) $RPhO(OCH_2CH_2)_mOH$, wherein R is an alkyl group having from about 5 to about 30 carbon atoms, Ph is phenyl and m is an integer in the range of from about 5 to about 50;

(c) $R_1(OR_2)_nSO_3X$, wherein:

(i) $R_1$ is selected from the group consisting of:
  a. alkyl groups having from 1 to about 30 carbon atoms;
  b. cycloalkyl groups having 5 or 6 carbon atoms;
  c. $C_1$–$C_4$ alkyl substituted cycloalkyl groups, phenyl, alkyl substituted phenol of the general formula $(R_3)_aPh$—, wherein Ph is phenyl, $R_3$ is an alkyl group having from 1 to about 18 carbon atoms and a is an integer of from 1 to 3, and phenyl-alkyl groups wherein the alkyl groups have from 1 to about 18 carbon atoms and the phenyl-alkyl groups have a total of from about 8 to about 28 carbon atoms;

(ii) $R_2$ is a substituted ethylene group of the formula —$CH_2CH_2R_4$, wherein $R_4$ is selected from hydrogen, methyl, ethyl or mixtures thereof;

(iii) n is a number from 0 to about 40 provided that when $R_1$ is phenyl injecting the slurry downhcle and through the perforations within the casing or alkyl substituted phenyl, n is at least 1;

(iv) and X is any compatible cation;

(d) $R_5$—$Ph(OR_6)_oSO_3X$, wherein $R_5$ is an alkyl radical having in the range of from 1 to about 9 carbon atoms, $R_6$ is the group —$CH_2CH_2$—, o is an integer from about 10 to about 20 and X is a compatible cation;

(e) $R_7(OR_8)_pSO_3X$, wherein $R_7$ is an alkyl group having in the range of from about 5 to about 20 carbon atoms, $R_8$ is the group —$CH_2CH_2$—, p is an integer in the range of from about 10 to about 40 and X is a compatible cation; and, (f) mixtures thereof.

17. The method of claim 16, further comprising oil soluble particles.

18. The method of claim 13, wherein the subterranean formation has an initial fluid permeability less than about 1 millidarcy.

19. The method of claim 13, further comprising oil soluble particles.

20. The method of claim 19, wherein the oil soluble particles comprise gilsonite.

* * * * *